United States Patent [19]

Swarup et al.

[11] Patent Number: 5,506,325

[45] Date of Patent: Apr. 9, 1996

[54] COATING COMPOSITION HAVING IMPROVED RHEOLOGY CONTROL AND COPOLYMER, MIXTURE AND PROCESS THEREFOR

[75] Inventors: Shanti Swarup; James R. Christenson, both of Gibsonia; B. Keith Johnston, Arnold; James B. O'Dwyer, Valencia; Edward R. Coleridge, Lower Burrell, all of Pa.; Andrew T. Carroll, Westlake, Ohio

[73] Assignee: PPG Industries, Inc., Pittsburgh, Pa.

[21] Appl. No.: 356,808

[22] Filed: Dec. 15, 1994

[51] Int. Cl.$^6$ ........................................... C08F 20/10
[52] U.S. Cl. .................................................. 526/318.41
[58] Field of Search ................................. 526/318.41

[56] References Cited

U.S. PATENT DOCUMENTS

| | | |
|---|---|---|
| 3,813,254 | 5/1974 | Makhlouf . |
| 3,880,796 | 4/1975 | Christenson et al. ............ 260/33.6 UA |
| 3,966,667 | 6/1976 | Sullivan et al. ................. 260/33.6 UA |
| 4,055,607 | 10/1977 | Sullivan et al. ......................... 260/851 |
| 4,147,679 | 4/1979 | Scriven et al. .................... 260/29.2 TN |
| 4,147,688 | 4/1979 | Makhlouf et al. ............... 260/33.6 EP |
| 4,180,489 | 12/1979 | Andrew et al. ........................... 428/402 |
| 4,180,619 | 12/1979 | Makhlouf et al. ....................... 526/202 |
| 4,403,003 | 9/1983 | Backhouse ............................ 427/407.1 |
| 4,411,951 | 10/1983 | Barsotti .................................... 428/328 |
| 4,425,450 | 1/1984 | Horvath .................................... 523/334 |
| 4,558,075 | 12/1985 | Suss et al. .............................. 523/216 |
| 4,569,966 | 2/1986 | Piccirilli et al. ......................... 524/589 |
| 4,620,993 | 11/1986 | Suss et al. ............................. 427/407.1 |
| 4,764,430 | 8/1988 | Blackburn et al. ...................... 428/413 |
| 4,829,120 | 5/1989 | Yabuta ..................................... 524/460 |
| 4,927,868 | 5/1990 | Schimmel et al. ....................... 523/439 |
| 4,965,317 | 10/1990 | Kania et al. ............................. 525/155 |
| 5,025,060 | 6/1991 | Yabuta et al. ........................... 524/533 |
| 5,071,904 | 12/1991 | Martin et al. ............................ 524/458 |
| 5,077,347 | 12/1991 | Yabuta et al. ........................... 524/504 |
| 5,196,485 | 3/1993 | McMonigal et al. ................. 525/327.3 |

FOREIGN PATENT DOCUMENTS 0457939  7/1994  European Pat. Off. .

*Primary Examiner*—Joseph L. Schofer
*Assistant Examiner*—N. Sarofin
*Attorney, Agent, or Firm*—Krisanne Shideler; Kenneth J. Stachel

[57] ABSTRACT

A non-gelled copolymer is prepared from: I) at least one ethylenically unsaturated aliphatic or aromatic monomer that is unsubstituted with reactive functionality and/or has hydroxyl functionality, II) an ethylenically unsaturated monomer having one acid functional group; and III) an ethylenically unsaturated oligomeric monomer having a number average molecular weight of about 1500 to about 4000 and which is derived from a hydroxyl functional acid having a predominantly hydrocarbon chain of from about 10 to 19 carbon atoms. The amounts of the monomers based upon the total solid weight of reactants used to prepare the copolymer are: about 80 to about 95 for I; about 3 to about 6 percent for II; and about 2 to about 14 percent for III. The ungelled copolymer can be present with hydrophobic amorphous fumed silica in amounts of about 50 to about 90 for the copolymer and about 10 to about 50 all as percentages by weight based on the weight of the two components. The ungelled copolymer alone or with the silica can be present along with coating components like film forming polymers, aqueous and/or organic solvent vehicles and optionally one or more pigments. In the colored and/or clear coating compositions and in the methods of their application to substrates, the amount of the silica is up to about 2.5 percent by weight, and the ratio of the copolymer to the silica is generally in the range of from about 9:1 to 1:1 to yield coatings with good rheology control.

22 Claims, No Drawings

COATING COMPOSITION HAVING IMPROVED RHEOLOGY CONTROL AND COPOLYMER, MIXTURE AND PROCESS THEREFOR

BACKGROUND OF THE INVENTION

The present invention relates to a novel copolymer, a rheology control mixture and coating compositions containing the copolymer, and methods of preparing the copolymer and using the copolymer in a coating composition.

An ongoing trend in the automotive industry has been to develop coating systems which provide smooth, glossy, mirror-like finishes in both solid colors and the currently popular metallic colors. Recently, there has also been an effort in the automotive industry to reduce atmospheric pollution due to volatile solvents emitted during the painting process. One approach to this end has been to develop "high solids" coating compositions containing low molecular weight polymeric binders. Unfortunately, many of the high solids coating compositions have a tendency to sag on application and when baked. Such sagging adversely affects the appearance properties of both pigmented and unpigmented coating compositions. The adverse effects of sagging on the appearance properties of cured films are particularly severe when the high solids coating compositions contain metallic flake pigments. The metallic coating compositions also tend to have poor pattern control; that is, orientation of the metallic flake pigment, which results in poor appearance. Control of pigment orientation in metallic high solids coatings provides a lustrous shiny appearance ("brightness of face") in the cured films along with excellent flop. By flop is meant the visual change in brightness or lightness of the metallic coating as the viewing angle changes; that is, a change from 90 to 180 degrees. The greater the contrast from light to dark appearance with respect to viewing angle, the better the flop. Flop is a desirable appearance property because it accentuates the contours of a curved surface such as on an automobile body.

In an attempt to alleviate sag problems, materials such as pyrogenic or fumed silica have been added to high solids coating compositions. Also as disclosed in EP 0457939 B1 the hydrophobic type silica can be used with a nonionic fluorocarbon polymer bridging agent. However, such materials may not provide adequate pattern control in metallic coating compositions and may decrease the distinctness of image in clear coatings. Distinctness of image is the mirror-like quality of a coating system and is directly affected by the smoothness of the coating.

It would be desirable to provide a low-cost rheology control additive for use in conventional coating compositions which provides acceptable sag control and pigment orientation without adversely affecting other appearance properties, for example, distinctiveness of image. It is also desirable to have such a coating composition by inclusion of or modification by as few components as possible for instance by the addition of one or two additional or modified components that cooperate with each other. It is also desirable to provide a component that cooperates with existing rheology control additives or forms a mixture with rheology control additives to yield a coating composition which can be used as either a pigmented or unpigmented coating in a color plus clear composite coating.

SUMMARY OF THE INVENTION

One or more of the aforementioned improvements are provided by the present invention. The present invention includes a non-gelled copolymer reaction product comprising about 80 to about 95 percent by weight of an ethylenically unsaturated aliphatic or aromatic monomer that is unsubstituted with reactable functionality or has hydroxyl functionality, for example, vinylic monomers such as styrene and alkyl esters of acrylic acid and methacrylic acid with an alkyl group having from about 1 to 17 carbon atoms such as methyl methacrylate, butyl acrylate, and butyl methacrylate; and mixtures thereof; about 3 to about 6 percent by weight of an ethylenically unsaturated monomer having one acid functional group; and about 2 to about 14 percent by weight of an ethylenically unsaturated oligomeric monomer having a number average molecular weight of about 1500 to about 4000 and which is derived from a hydroxyl functional acid having a predominantly hydrocarbon chain of from about 10 to 19 carbon atoms. Note that the percentages by weight are based upon the total solid weight of reactants used to prepare the copolymer.

Additional aspects of the present invention include coating compositions containing the copolymer and up to about 2.5 percent by weight of a hydrophobic amorphous fumed silica. The method of the present invention involves applying a composite coating to a substrate which comprises applying to the substrate a colored film-forming composition to form a base coat and applying to the base coat a clear film-forming composition to form a transparent top coat over the base coat. The copolymer and silica described above may be present in either or both of the colored and clear film-forming compositions. Another aspect of the present invention includes a rheology control additive mixture and a method of preparing a rheology control additive mixture by grinding the silica with the copolymer in a conventional manner for addition to a coating composition.

DETAILED DESCRIPTION

In the following description of the invention the amounts of the various materials and components are expressed in numerical quantities and ranges of these quantities. It should be understood that except for the operating examples and the claims or unless specifically expressed to the contrary, these expressions of numerical quantities and ranges for use and quantities of ingredients are modified by the word "about" in the broadest description of the invention. This shows that the amounts may vary somewhat to a quantity less than the stated lower limit and greater than the stated upper limit while still accomplishing the objectives of the invention. Although it is particularly useful to practice the invention with or within the specifically stated numerical quantities or ranges.

The copolymer of the present invention is non-gelled. By "non-gelled" is meant that the copolymer is substantially free from crosslinking, and the copolymer has a measurable intrinsic viscosity when dissolved in a suitable solvent. In contrast, a gelled resin, having an essentially infinite molecular weight, would have an intrinsic viscosity too high to measure.

The copolymer mentioned above used in the coating (i.e., film-forming) compositions of the present invention may be prepared by reacting ethylenically unsaturated monomers ("reactants") via free radical initiated addition polymerization techniques.

Any conventional aliphatic or aromatic ethylenically unsaturated monomers that are unsubstituted with reactive functionality or that have hydroxyl functionality may be used to prepare the copolymer as known by those skilled in the art, provided they do not cause or contribute to the formation of a gelled copolymer during copolymerization. By "unsubstituted with reactive functionality" it is meant that the copolymer is not substituted with any groups reactive with hydroxyl or acid, nor substituted with any interreactive groups, where either or both of which could lead to the formation of a gelled copolymer. Such reactive groups include epoxy, alkoxysilane, amino, amido, or isocyanato. Examples of suitable monomers include vinyl aromatic monomers such as styrene, alphamenhyl styrene, and tertiary butyl styrene; vinyl aliphatic monomers such as ethylene, propylene, and 1,3-butadiene; and alkyl esters of acrylic and methacrylic acid having from 1 to 17 carbon atoms in the alkyl group including methyl (meth) acrylate, ethyl (meth) acrylate, butyl (methacrylate, cyclohexyl (meth) acrylate, 2-ethylhexyl (meth) acrylate, isobornyl (meth)acrylate and lauryl (meth) acrylate. The ethylenically unsaturated monomers are typically present in the copolymer at about 80 to 95% total by weight, preferably 90 to 95% total by weight, based upon the total solid weight of reactants used to prepare the copolymer.

Preferably, the ethylenically unsaturated monomer present in the copolymer of the present invention is selected from the group consisting of methyl methacrylate, butyl acrylate, butyl methacrylate, styrene, and mixtures thereof. More preferably, the ethylenically unsaturated monomer is a mixture of methyl methacrylate, butyl acrylate, and styrene, wherein the methyl methacrylate is present at 45 to 55 percent by weight, the butyl acrylate is present at 30 to 36 percent by weight, and the styrene is present at 5 to 6 percent by weight. The percentages by weight are based upon the total solid weight of reactants used to prepare the copolymer. These monomers are preferred because they produce a copolymer with a glass transition temperature that allows for the use of the copolymer in coating compositions with a wide variety of applications.

The copolymer further includes 3 to 6 percent by weight, preferably 5 to 6 percent by weight of an ethylenically unsaturated monomer having one acid functional group, based upon the total solid weight of reactants used to prepare the copolymer. Examples of suitable ethytenically unsaturated monomers having one acid functional group include acrylic acid, methacrylic acid, and crotonic acid. Acrylic acid is preferred. Again as with the ethylenically unsaturated monomer this acid functional monomer is present in the copolymer through addition type polymerization known to those skilled in the art.

The copolymer further includes 2 to 14 percent by weight, preferably 2 to 7 percent by weight of an ethylenically unsaturated oligomeric monomer which is derived from a hydroxyl functional acid having a predominantly hydrocarbon chain of from about 10 to 19 carbon atoms. Preferably the chain is a hydrocarbon chain and the hydroxyl functional acid monomer is 12-hydroxystearic acid. The preparation of this oligomeric monomer is described in more detail below.

The ethylenically unsaturated oligomeric monomer generally has a number average molecular weight of 1500 to 4000, preferably about 2000. Such oligomeric monomers may be prepared, for example, by condensation reactions yielding a polyester or polyether. Hydroxyl functional acids such as 12-hydroxystearic acid may be homopolymerized and the resulting acid functional polyester (poly(12-hydroxystearic acid)) may be reacted with an ethylenically unsaturated monomer such as a monoepoxy group-containing polymerizable unsaturated compound such as glycidyl acrylate or glycidyl methacrylate, allyl glycidyl ether, (3,4-epoxycyclohexyl)methyl acrylate and the like. Alternatively, a hydroxy fatty acid such as 12-hydroxystearic acid may be copolymerized with a saturated mono- or diacid having a hydrocarbon chain of from about 10 to 19 carbon atoms and the resulting polyester may be reacted with an ethylenically unsaturated monomer such as gtycidyl acrylate or glycidyl methacrylate. Examples of suitable saturated mono- or diacids having a hydrocarbon chain of from about 10 to 19 carbon atoms include isodecanoic acid, lauric acid, hexadecanoic acid, dodecanedioic acid, and stearic acid.

The resulting ethylenically unsaturated oligomeric monomer is later reacted with the ethylenically unsaturated monomers described above so as to form the copolymer of the present invention. Most preferably the quantities of the monomers employed to prepare the copolymer are such that the total is 100. Also the copolymer is formed from the addition polymerizable monomers so that the copolymer has little if any unsaturation and is essentially free of unsaturation.

In another embodiment, hydroxyl functional acids having a hydrocarbon chain of from about 10 to 19 carbon atoms may be reacted with an ethylenically unsaturated acid having from about 10 to 19 carbon atoms. The unsaturated acid is preferably monounsaturated. Examples of unsaturated acids include oleic acid and linolenic acid. The resulting ethylenically unsaturated oligomeric monomer is later reacted with the ethylenically unsaturated monomers described above so as to form the copolymer of the present invention. In this embodiment, the hydroxyl functional acid should be in substantial stoichiometric excess relative to the unsaturated acid in order to prevent formation of a microgel during the subsequent copolymer production. Preferably the resulting ethylenically unsaturated oligomeric monomer has 0.7 to 1 unsaturated groups per molecule.

In a preferred embodiment of the invention, stearic acid is reacted with 12-hydroxystearic acid in a 1 to 5 mole ratio, and the resultant acid functional polyester is reacted with glycidyl methacrylate in a 1 to 1 mole ratio to produce an ethylenically unsaturated oligomeric monomer.

In a particularly preferred embodiment of the invention, 12hydroxystearic acid is homopolymerized and the resultant acid functional polyester is reacted with glycidyl methacrylate in a 1 to 1 mole ratio to produce an ethylenically unsaturated oligomeric monomer.

The copolymer of the present invention may further include up to 10% by weight, based upon the total solid weight of reactants used to prepare the copolymer, of a hydroxyl functional ethylenically unsaturated monomer selected from the group consisting of hydroxypropyl (meth-)acrylate, hydroxyethyl (meth) acrylate, hydroxybutyl (meth) acrylate, and hydroxypropyl-, or hydroxybutylacrylates.

A particularly preferred copolymer comprises (+/–5%) 51.6 percent methyl methacrylate, 35.8 percent butyl acrylate, 5.3 percent styrene, 5.3 percent acrylic acid, and 2 percent ethylenically unsaturated oligomeric monomer which is derived from a hydroxyl functional acid having a hydrocarbon chain of from about 15 to 19 carbon atoms.

The copolymers of the present invention can be prepared by free radical initiated addition polymerization of a mixture of the reactants by organic solution polymerization techniques generally known to those skilled in the art. One suitable method is to dissolve the reactants in an organic solvent or mixture of solvents including ketones such as methyl ethyl ketone, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 110 to 160° C., and a mixture of reactants and free radical initiator is slowly added to the refluxing solvent, over a period of about 1 to 5, preferably 1 to 3 hours. Adding the reactants too quickly may cause poor conversion or a high and rapid exotherm, which is a safety hazard. Suitable free radical initiators are those typically used in the art such as t-amyl peroxyacetate, which is preferred, di-t-amyl peroxyacetate, di-t-amyl peroxide, and 2,2'-Azebis(2-methylbutanenitrile). The free radical initiator is typically present in the reaction mixture at about 2 to 10%, based on total weight of the reactants.

The copolymer prepared by the above described technique is non-gelled or ungelled and has a weight average molecular weight of around 7,000 to around 18,000, preferably 8,000 to 13,000. This technique yields a product with a relatively high solids content (at least about 60 weight percent solids).

The copolymer prepared by the techniques described above may be used in organic solvent based film-forming compositions; that is, film-forming compositions using one or more organic solvents as carriers and containing less than about 5% by weight water, based on total weight of the film-forming composition. In addition, acid groups in the copolymer may be neutralized with amines and the copolymer dispersed in water for use in aqueous based film-forming compositions. By aqueous based is meant that the film-forming compositions contain at least about 20% by weight water as a carrier, based on total weight of the film-forming composition.

The copolymer prepared as described above may be added to a coating composition at 1 to 22.5 percent by weight, preferably 3 to 5 percent by weight. The percentages by weight are based upon total resin solids in the coating composition. A particularly suitable coating composition is the epoxy-acid coatings as described in U.S. Pat. No. 5,196,485, hereby incorporated by reference for the teaching of such epoxy-acid coatings.

The coating compositions of the present invention are preferably liquid high solids coating compositions, that is, compositions containing greater than about 40 percent, preferably greater than 50 percent by weight resin solids. The solids content is determined by heating a sample of the composition to 105°–110° C. for 1–2 hours to drive off the volatile material and measuring weight loss. Although the compositions are preferably liquid coating compositions, they may be formulated as powder coating compositions by any method known to those skilled in the art.

The copolymer of the present invention can be present with silicas like fumed silica to form a rheology control additive mixture. The additive mixture contains an amount of the copolymer in the range of 50 to 90 percent, preferably 65 to 70 percent and an amount of 10 to 50 percent, preferably 30 to 35 percent by weight of a hydrophobic amorphous fumed silica. The percentages by weight are based upon total weight of solids in the additive mixture. The ratio of the copolymer to the silica is generally in the range of 9:1 to 1:1, preferably 2:1.

The coating composition with the copolymer of the present invention contains up to about 2.5 percent by weight, preferably about 1 to about 1.5 percent by weight of a hydrophobic amorphous fumed silica. The percentages by weight are based upon total weight of resin solids in the coating composition. Suitable silicas include colloidal silica which has been partially or totally surface modified through the silanization of hydroxyl groups on the silica particle, thereby rendering part or all of the silica particle surface hydrophobic. Examples of suitable hydrophobic silicas include AEROSIL R972, AEROSIL R812 and AEROSIL R805, all commercially available from Degussa Corporation. A particularly preferred fumed silica is available from Degussa Corporation as AEROSIL R 812. The copolymer and silica may be added to the coating composition separately, or, preferably, the silica may be dispersed in the copolymer by a grinding process using conventional equipment such as high speed blade mixers, ball mills, or sand mills. If the silica is dispersed in the copolymer, the dispersion may be added to the coating composition at any time during formulation as a rheology control additive mixture.

The coating composition generally may be any colored or clear coating composition known to those skilled in the art and may be applied to a substrate by itself or as a colored and/or clear film-forming composition in a color plus clear composite coating as known to those skilled in the art.

The colored film-forming composition can be any of the compositions useful in coatings applications, particularly automotive applications. The film-forming composition comprises a resinous binder and a pigment to act as the colorant. Particularly useful resinous binders are acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrytonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as an aminoplast. Other crosslinking agents such as polyisocyanates including blocked polyisocyanates may also be used. Also, the acrylic polymer can be prepared with N-(alkoxymethyl)acrylamides and N-(alkoxymethyl)methacrylamides which result in self-crosslinking acrylic polymers.

Besides acrylic polymers, the resinous binder for the colored film-forming composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired no produce air-drying alkyd resins, suitable drying oil fatty acids may be used and include those derived from linseed oil, soya bean oil, tall oil, dehydrated castor oil, or tung oil.

The polyesters and alkyd resins contain free hydroxyl and/or carboxyl groups which are available for further crosslinking reactions. Suitable crosslinking agents are the amine or amidealdehyde condensates (aminoplasts) or the polyisocyanate curing agents as are well known in the art.

Polyurethanes can also be used as the resinous binder of the colored film-forming composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylone potyphenyl isocyanate.

Most of the polymers prepared as described above are organic solvent-based polymers, although acrylic polymers can be prepared via aqueous emulsion polymerization techniques and used as aqueous-based colored film-forming composition compositions. Waterborne colored film-forming compositions used as base coats in color-plus-clear composite coatings are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the colored film-forming composition. Further, waterborne coatings such as those described in U.S. Pat. No. 5,071,904 can be used as the colored film-forming composition.

The colored film-forming composition also contains pigments. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica. Aluminum flake is preferred.

Besides the metallic pigments, the colored film-forming compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80, usually about 1 to 30 percent by weight based on weight of coating solids. The metallic pigment is employed in amounts of about 0.5 to 25 percent by weight based on weight of coating solids.

If desired, the colored film-forming composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The clear film-forming composition of the present invention which may be used alone or as the transparent top coat in a color plus clear composite coating is preferably a liquid crosslinkable composition comprising a polyepoxide and a polyacid curing agent such as those described in U.S. Pat. No. 5,196,485.

The clear film-forming compositions of the present invention may optionally contain an aminoplast resin for improved resistance to water spotting. Typically, when used, the aminoplast resin is present in the composition in amounts up to about 30 percent by weight, more preferably from about 2 to 20 percent by weight, and most preferably from about 5 to 15 percent by weight based on total weight of resin solids in the film-forming composition.

Optionally, the clear film-forming composition can contain silane functionality which can be incorporated into the composition by using a reactive silane group-containing material such as gamma-methacryloxypropyltrimethoxysilane or mercaptopropyltrimethoxysilane which can be used in the preparation of the epoxy group-containing acrylic polymer. Such materials coreact with the polymerizing monomers or polymers forming a polymer with silane curing groups. Alternately, a silane group-containing material such as methyltrimethoxysilane can be included in the composition. The silane functionality results in a lower temperature cure.

The clear film-forming composition may optionally contain an aliphatic monocarboxylic acid containing at least 6, preferably from 8 to 22 carbon atoms such as described in U.S. Pat. No. 4,764,430. Examples of such acids include lauric acid and isostearic acid, which as preferred. These monocarboxylic acids, when used, are present in amounts up to 15 percent, preferably 0.5 to 10 percent by weight based on total weight of resin solids.

The clear film-forming composition may also contain an anhydride, preferably an anhydride which is a liquid at 25° C. The presence of such an anhydride in the composition provides for improved cure response. Examples of suitable anhydrides include dodecenyl succinic anhydride and alkyl-substituted hexahydrophthalic anhydrides wherein the alkyl group contains up to 7 carbon atoms, more preferably up to 4 carbon atoms, such as methyl hexahydrophthalic anhydride. The amount of the anhydride which is used in the curable composition can vary from about 0 to 40 percent, preferably from about 5 to 25 percent by weight based on total weight of resin solids.

To form one-package compositions, the clear film-forming composition is substantially free of basic esterification catalyst. Although the absence of catalyst has a negative effect on the cure of the composition, it provides for a stable composition and is also beneficial in reducing or eliminating cure inhibition between layers in a color-plus-clear formulation when the base coat contains an acid-catalyzed resinous binder. The high functionality associated with the polyepoxide and polyacid provide for sufficient cure response. In a preferred embodiment, the clear film-forming composition of the present invention has no or only small amounts of basic esterification catalyst such that the composition is stable for a time sufficient to allow formulation of the composition as a single component; i.e., one-package, composition.

To form multi-package or multi-component compositions in which the polyepoxide and polyacid curing agent are present in separate packages and combined shortly before application, an esterification catalyst to promote cure can be included in the composition. A number of such catalysts are known in the art. These catalysts include basic materials such as secondary amine catalysts, for example, piperidine; tertiary amine catalysts such as N,N-dimethyldodecylamine, pyridine, and N,N-dimethylaniline; ammonium compounds, including tetrabutylammonium bromide, tetrabutylammonium hydroxide, and tetrabutylammonium acetate; phosphonium compounds, including ethyltriphenylphosphonium acetate and tetrabutyl phosphonium bromide; and other ammonium and phosphonium salts.

The clear film-forming composition may also contain a copolymer of an alpha olefin such as 1-octene or 1-decene and an olefinically unsaturated anhydride such as maleic anhydride. The anhydride group in such a polymer may be ring-opened with ethanol. These copolymers improve the humidity resistance of the resultant cured coating. The use of these copolymers in polyepoxide-polyacid curable compositions is described more fully in U.S. Pat. No. 4,927,868. When used, the copolymers are present in amounts up to 25 percent, preferably 5 to 20 percent by weight based on total weight of resin solids of the composition.

Other optional ingredients, such as plasticizers, antioxidants, UV light absorbers and stabilizers may be formulated into the clear film-forming composition. When used, these ingredients are present (on an individual basis) in amounts up to 10 percent, preferably from about 0.1 to 5 percent by weight based on total weight of resin solids of the composition.

The equivalent ratio of the reactants present in the clear film-forming compositions are adjusted such that for each equivalent of epoxy there are 0.3 to 3.0, preferably 0.75 to 1.5 equivalents of carboxyl (anhydride, if present, is considered monofunctional).

The coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

The coating compositions can be applied over virtually any substrate including wood, metals, glass, cloth plastic, foam, including elastomeric substrates and the like. They are particularly useful in applications over metals and elastomeric substrates that are found on motor vehicles.

When the colored film-forming composition is applied to a substrate as a base coat, a film of the base coat is formed on the substrate. Typically, the base coat thickness will be about 0.01 to 5 mils (0.254 to 127 microns), preferably 0.1 to 2 mils (2.54 to 50.8 microns)in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the topcoat can be applied to the base coat without the former dissolving the base coat composition. Suitable drying conditions will depend on the particular base coat composition, and on the ambient humidity with certain waterbased compositions, but in general a drying time of from about 1 to 5 minutes at a temperature of about 80°–250° F. (20°–121° C.) will be adequate to ensure that mixing of the two coats is minimized. At the same time, the base coat film is adequately wetted by the topcoat composition so that satisfactory intercoat adhesion is obtained. Also, more than one base coat and multiple top coats may be applied to develop the optimum appearance. Usually between coats, the previously applied coat is flashed; that is, exposed to ambient conditions for about 1 to 20 minutes.

The clear top coat composition is applied to the base coat by any of the conventional coating techniques mentioned above, with spray applications preferred. Typically the clear top coat is applied to the base coat via a wet-on-wet technique before the base coat has been cured. The thickness of the coating is usually from about 0.5–5 mils (12.7 to 127 microns), preferably 1.2–3 mils (30.48 to 76.2 microns). The two coatings are then heated to conjointly cure both coating layers. Curing conditions such as described above may be used.

The coating compositions of the present invention have excellent etch resistance properties. As used herein, the term "etch resistance" refers to the ability of a cured composition to resist etching by acids and water spotting. Etch resistance is typically evaluated by visual inspection of coated substrates after actual or simulated weathering. It should be noted that simulated weathering typically, but not always, corresponds to actual weathering. Moreover, it should be noted that cured compositions may have different etch resistance properties when subjected to actual weathering in different geographic locations. An etch resistant composition, as discussed herein, refers to a composition which has etch resistant properties under actual weathering in at least one geographic site or which has etch resistant properties under simulated weathering.

The invention will be further described by reference to the following examples. Unless otherwise indicated, all parts are by weight.

The following examples (A to D) illustrate the preparation of acrylic copolymers containing various levels of poly-12-hydroxystearic acid methacrylate (PHSAMA).

Example A

An acrylic copolymer which contained 13.9% by weight PHSANL, based on the total solid weight of reactants used to prepare the copolymer was prepared from the following ingredients:

| Ingredients | Weight (grams) | Percentage by weight |
| --- | --- | --- |
| Methyl methacrylate | 962.9 | 40.8 |
| Butyl acrylate | 722.4 | 30.6 |
| PHSAMA[1] | 329.2 | 13.9 |
| Styrene | 120.4 | 5.1 |
| Acrylic acid | 120.4 | 5.1 |
| LUPERSOL 555M60[2] | 166.6 | 4.2 |

[1]Oligomeric monomer prepared by condensing 6 moles of 12-hydroxystearic acid, followed by the reaction of the terminal acid group with 1 mole of glycidyl methacrylate. The resulting product had an acid value less than 0.5.
[2]t-amyl peracetate (60% in odorless mineral spirits) available from Atochem Inc.

554.4 grams of butyl acetate were charged to a suitable reactor and heated to reflux. The methyl methacrylate, butyl acrylate, PHSAMA, styrene, and acrylic acid were mixed together to form a premixture of the vinyl monomer feed. The LUPERSOL 555M60, a free radical initiator, and 451.1 grams of butyl acetate were also mixed together to form a premixture of initiator. The premixture of initiator was added to the reactor over 3.5 hours. Fifteen minutes after the start of the initiator feed, the premixture of vinyl monomers was added to the reactor over 3 hours. Upon the completion of the initiator feed, the contents of the reactor were held for 1 hour. The reaction product was then cooled to room temperature. The product had a solids content of about 68% and a weight average molecular weight of about 13,000.

Example B

An acrylic copolymer which contained 6.7% by weight PHSAMA based on the total solid weight of reactants used to prepare the copolymer was prepared as in Example A, except that the amounts of methyl methacrylate, butyl acrylate, and PHSAMA used were 1048, 807.9, and 157.8 grams, respectively. The product had a solids content of about 68% and a weight average molecular weight of about 10,000.

Example C

An acrylic copolymer which contained 3.8% by weight PHSAMA based on the total solid weight of reactants used to prepare the copolymer was prepared as in Example A, except that the amounts of methyl methacrylate, butyl acrylate, and PHSAMA used were 1116.4, 807.9, and 89.5 grams, respectively. The product had a solids content of about 68% and a weight average molecular weight of about 10,000.

Example D

An acrylic copolymer which contained 1.9% by weight PHSAMA based on the total solid weight of reactants used to prepare the copolymer was prepared as in Example A, except that the amounts of methyl methacrylate, butyl acrylate, and PHSAMA used were 1163.5, 807.9, and 45 grams, respectively. The product had a solids content of about 68% and a weight average molecular weight of about 10,000.

The following examples (E to G) illustrate the preparation of various resins used in the formulation of coating compositions of the present invention.

Example E

An acrylic polymer which contained epoxy functionality was prepared from the following ingredients:

| Ingredients | Weight (grams) | Percentage by weight |
| --- | --- | --- |
| Glycidyl methacrylate | 1200.0 | 60.0 |
| Methyl methacrylate | 20.0 | 1.0 |
| Butyl methacrylate | 600.0 | 30.0 |
| Styrene | 140.0 | 7.0 |
| Methyl styrene dimer | 40.0 | 2.0 |
| LUPERSOL 555M60 | 200.0 | 6.0[1] |
| t-Butyl perbenzoate | 10.0 | 0.5[1] |
| t-Butyl perbenzoate | 10.0 | 0.5[1] |
| t-Butyl perbenzoate | 10.0 | 0.5[1] |

[1]On monomers.

A blend of ethyl 3-ethoxypropionate (597.8 grams) and xylene (184.5 grams) was charged to a suitable reactor and heated to reflux. The glycidyl methacrylate, methyl methacrylate, butyl methacrylate, styrene, and methyl styrene dimer were mixed together to form a premixture of the vinyl monomer feed. The LUPERSOL 555M60 and 100 grams of ethyl 3-ethoxypropionate were also mixed together to form a premixture of initiator. The premixture of vinyl monomers and premixture of initiator were added simultaneously to the reactor over a period of about 3 hours while maintaining the reaction at reflux. Upon the completion of the addition, the reaction mixture was held at reflux for 1 hour followed by the addition of the first portion of t-butyl perbenzoate, a free radical initiator. The reaction mixture was then held at reflux for 30 minutes. The second portion of t-butyl perbenzoate was added and the reaction mixture held for another 30 minutes at reflux. Then the third portion of t-butyl perbenzoate was added and the reaction mixture held at reflux for two hours. The reaction product was then cooled to room temperature. The product had a solids content of about 64% and a weight average molecular weight of about 2800. The theoretical epoxy equivalent weight based on solids was 237.

Example F

An acrylic polymer which contained epoxy functionality was prepared from the following ingredients:

| Ingredients | Weight (grams) | Percentage by weight |
| --- | --- | --- |
| Glycidyl methacrylate | 805.0 | 35.0 |
| Methyl methacrylate | 46.0 | 2.0 |
| Butyl methacrylate | 1403.0 | 61.0 |
| Styrene | 46.0 | 2.0 |
| LUPERSOL 555M60 | 230.0 | 6.0[1] |
| t-Butyl perbenzoate | 23.0 | 1.0[1] |
| t-Butyl perbenzoate | 23.0 | 1.0[1] |
| t-Butyl perbenzoate | 23.0 | 1.0[1] |

[1]On monomers.

A blend of ethyl 3-ethoxypropionate (255.3 grams) and xylene (111.3 grams) was charged to a suitable reactor and heated to reflux. The glycidyl methacrylate, methyl methacrylate, butyl methacrylate, and styrene were mixed together to form a premixture of the vinyl monomer feed. The LUPERSOL 555M60 and 115 grams of ethyl 3-ethoxypropionate were also mixed together to form a premixture of initiator. The premixture of vinyl monomers and premixture of initiator were added simultaneously to the reactor over a period of about 3 hours while maintaining the reaction at reflux. Upon the completion of the addition, the reaction mixture was held at reflux for 1 hour followed by the addition of the first portion of t-butyl perbenzoate. The reaction mixture was then held at reflux for 30 minutes. The second portion of t-butyl perbenzoate was added over about one hour and the reaction mixture held for another 30 minutes at reflux. Then the third portion of t-butyl perbenzoate was added over about one hour and the reaction mixture held at reflux for two hours. An additional 90 grams of ethyl 3-ethoxypropionate was added to the reaction product to adjust the solids to about 74%. The reaction product was then cooled to room temperature. The product had a solids content of about 74% and a weight average molecular weight of about 2800 as determined by gel permeation chromatography using a polystyrene standard. The theoretical epoxy equivalent weight based on solids was 410.

Example G

A polyacid half-ester of di-trimethylolpropane and methylhexahydrophthalic anhydride was prepared from the following ingredients:

| Ingredients | Weight (grams) |
| --- | --- |
| Di-trimethylolpropane | 1584.8 |
| Methylhexahydrophthalic anhydride | 4120.7 |
| Methyl isobutyl ketone | 570.5 |
| n-amyl alcohol | 2114.4 |

The ditrimethylolpropane and 540.5 grams of methyl isobutyl ketone were charged to a suitable reactor and heated under a nitrogen atmosphere to 115° C. The methyl hexahydrophthalic anhydride was added over a period of about two hours at 115° C. The remainder of the methyl isobutyl ketone was added as a rinse. The reaction mixture was held at 115° C. for 4 hours. The reaction mixture was then cooled to 100° C., and the n-amyl alcohol was added. The reaction mixture was then heated to 105° C. and held for two hours, then cooled to room temperature. The product had a solids content of 72.3% and an acid value of 163.

Example H

A 1-octene/maleic anhydride/ethanol polymer was prepared from the following ingredients:

| Ingredients | Weight (grams) |
| --- | --- |
| 1-octene | 1821.6 |
| LUCIDOL 78[1] | 458.9 |
| Butyl acetate | 3781.8 |
| Maleic anhydride | 794.8 |
| Butyl acetate | 1890.9 |
| Denatured ethanol[2] | 1584 |
| Dimethylethanolamine | 4 |

[1]Benzoyl peroxide, 78% in water available from Pennwalt Corporation.
[2]95% ethanol, 5% methanol.

The 1-octene was charged to a suitable reactor and heated under a nitrogen atmosphere to a reflux temperature of 120° C. A mixture of the LUCIDOL 78 and the first charge of butyl acetate were added over a period of about three hours at 120° C. One half hour after the start of the first addition, a second mixture of the maleic anhydride and the second charge of butyl acetate was added over a period of about two hours. After completion of the additions, the reaction mixture was held at reflux for one hour. Solvent was then removed by distillation with a total distillate of 5457 grams removed. The resulting product was a 1-octene/maleic anhydride copolymer having a solids content of 75.9%, a number average molecular weight of about 1061 and a weight average molecular weight of about 2731.

The 1-octene/maleic anhydride copolymer (6640 grams) was charged to a suitable reactor along with the denatured ethanol and dimethylethanolamine and heated under a nitrogen atmosphere to a temperature of 70° C. until the acid value remained constant. Solvent was distilled off at 80° C. until the Gardner Holdt viscosity was U.

The following examples (I to M) illustrate the preparation of rheology control additives in accordance with the present invention, used in the formulation of coating compositions of the present invention. In each of the examples, the solvent and polymer were combined in a stainless steel beaker and the silica sifted into the mixture under agitation using a cowles blade until all of the silica was incorporated. A double disk agitator was then used and a charge of about 2000 grams Zircoa grinding media added. The sample was ground for 25 to 50 minutes to a Hegman reading of 8+. The resulting dispersion was filtered from the grinding media with a brass filter cone.

Example I (Comparative)

A rheology control additive was prepared from the following ingredients:

| Ingredient | Weight (grams) | Solids (grams) |
| --- | --- | --- |
| n-amyl alcohol | 190.1 | — |
| polyester[1] | 142.8 | 100.0 |
| AEROSIL R 812[2] | 54.2 | 54.2 |

[1]Made by reacting trimethylol propane and methylhexahydrophthalic anhydride in the ratio of 3 to 1, having an acid value of 163.
[2]Highly dispersed, hydrophobic, amorphous fumed silicon dioxide (silica) available from Degussa Corporation Example J A rheology control additive was prepared from the following ingredients:

| Ingredient | Weight (grams) | Solids (grams) |
| --- | --- | --- |
| xylene | 345.1 | — |
| Copolymer of Example A | 151.3 | 100.0 |
| AEROSIL R 812 | 53.9 | 53.9 |

Example K

A rheology control additive was prepared from the following ingredients:

| Ingredient | Weight (grams) | Solids (grams) |
| --- | --- | --- |
| xylene | 344.8 | — |
| Copolymer of Example B | 150.8 | 100.0 |
| AEROSIL R 812 | 53.9 | 53.9 |

Example L

A rheology control additive was prepared from the following ingredients:

| Ingredient | Weight (grams) | Solids (grams) |
| --- | --- | --- |
| xylene | 302.0 | — |
| Copolymer of Example C | 148.0 | 100.0 |
| AEROSIL R 812 | 50.0 | 50.0 |

Example M

A rheology control additive was prepared from the following ingredients:

| Ingredient | Weight (grams) | Solids (grams) |
| --- | --- | --- |
| xylene | 301.5 | — |
| Copolymer of Example D | 148.5 | 100.0 |
| AEROSIL R 812 | 50.0 | 50.0 |

The following examples (1 to 6) illustrate the preparation of various coating compositions.

Example 1 (Control)

A coating composition containing no rheology control additive was prepared from the following mixture of ingredients:

| Ingredients | Weight (grams) | Solids (grams) |
|---|---|---|
| ethyl 3-ethoxypropionate | 23.2 | — |
| TINUVIN 328[1] | 2.6 | 2.6 |
| 1-octene/maleic anhydride/ethanol copolymer of Example H | 12.3 | 8.6 |
| Epoxy functional acrylic polymer of Example E | 53.0 | 33.4 |
| Epoxy functional acrylic polymer of Example F | 24.8 | 18.4 |
| Polyacid half-ester of Example G | 52.0 | 37.1 |
| Propanol | 5.5 | — |
| Poly 2-ethylhexylacrylate[2] | 1.0 | 0.5 |
| TINUVIN 292[3] | 0.4 | 0.4 |

[1]Substituted benzotriazole UV light stabilizer available from Ciba Geigy Corporation.
[2]poly 2-ethylhexyl acrylate is a flow control agent of Mw = 32,936 and Mn = 7934 made in xylene at 50% solids.
[3]Sterically hindered tertiary amine light stabilizer available from Ciba Geigy Corporation.

Example 2 (Comparative)

A coating composition containing the rheology control additive of Example I was prepared from the following mixture of ingredients:

| Ingredients | Weight (grams) | Solids (grams) |
|---|---|---|
| ethyl 3-ethoxypropionate | 23.2 | — |
| TINUVIN 328 | 2.6 | 2.6 |
| 1-octene/maleic anhydride/ethanol copolymer of Example H | 12.3 | 8.6 |
| Epoxy functional acrylic polymer of Example E | 53.0 | 33.4 |
| Epoxy functional acrylic polymer of Example F | 24.8 | 18.4 |
| Polyacid half-ester of Example G | 52.0 | 37.1 |
| Propanol | 5.5 | — |
| Poly 2-ethylhexylacrylate | 1.0 | 0.5 |
| TINUVIN 292 | 0.4 | 0.4 |
| Rheology control additive of Example I | 10.7 | 4.2 |

Example 3

A coating composition containing the rheology control additive of Example J was prepared from the following mixture of ingredients:

| Ingredients | Weight (grams) | Solids (grams) |
|---|---|---|
| ethyl 3-ethoxypropionate | 23.2 | — |
| TINUVIN 328 | 2.6 | 2.6 |
| 1-octene/maleic anhydride/ethanol copolymer of Example H | 12.3 | 8.6 |
| Epoxy functional acrylic polymer of Example E | 53.0 | 33.4 |
| Epoxy functional acrylic polymer of Example F | 24.8 | 18.4 |
| Polyacid half-ester of Example G | 52.0 | 37.1 |
| Propanol | 5.5 | — |
| Poly 2-ethylhexylacrylate | 1.0 | 0.5 |
| TINUVIN 292 | 0.4 | 0.4 |
| Rheology control additive of Example J | 18.4 | 5.1 |

Example 4

A coating composition containing the rheology control additive of Example K was prepared from the following mixture of ingredients:

| Ingredients | Weight (grams) | Solids (grams) |
|---|---|---|
| ethyl 3-ethoxypropionate | 23.2 | — |
| TINUVIN 328 | 2.6 | 2.6 |
| 1-octene/maleic anhydride/ethanol copolymer of Example H | 12.3 | 8.6 |
| Epoxy functional acrylic polymer of Example E | 53.0 | 33.4 |
| Epoxy functional acrylic polymer of Example F | 24.8 | 18.4 |
| Polyacid half-ester of Example G | 52.0 | 37.1 |
| Propanol | 5.5 | — |
| Poly 2-ethylhexylacrylate | 1.0 | 0.5 |
| TINUVIN 292 | 0.4 | 0.4 |
| Rheology control additive of Example K | 18.4 | 5.1 |

Example 5

A coating composition containing the rheology control additive of Example L was prepared from the following mixture of ingredients:

| Ingredients | Weight (grams) | Solids (grams) |
|---|---|---|
| ethyl 3-ethoxypropionate | 23.2 | — |
| TINUVIN 328 | 2.6 | 2.6 |
| 1-octene/maleic anhydride/ethanol copolymer of Example H | 12.3 | 8.6 |
| Epoxy functional acrylic polymer of Example E | 53.0 | 33.4 |
| Epoxy functional acrylic polymer of Example F | 24.8 | 18.4 |
| Polyacid half-ester of Example G | 52.0 | 37.1 |
| Propanol | 5.5 | — |
| Poly 2-ethylhexylacrylate | 1.0 | 0.5 |
| TINUVIN 292 | 0.4 | 0.4 |
| Rheology control additive of Example L | 18.0 | 5.4 |

Example 6

A coating composition containing the rheology control additive of Example M was prepared from the following mixture of ingredients:

| Ingredients | Weight (grams) | Solids (grams) |
|---|---|---|
| ethyl 3-ethoxypropionate | 23.2 | — |
| TINUVIN 328 | 2.6 | 2.6 |
| 1-octene/maleic anhydride/ethanol copolymer of Example H | 12.3 | 8.6 |
| Epoxy functional acrylic polymer of Example E | 53.0 | 33.4 |
| Epoxy functional acrylic polymer of Example F | 24.8 | 18.4 |
| Polyacid half-ester of Example G | 52.0 | 37.1 |
| Propanol | 5.5 | — |
| Poly 2-ethylhexylacrylate | 1.0 | 0.5 |
| TINUVIN 292 | 0.4 | 0.4 |
| Rheology control additive | 18.0 | 5.4 |

| Ingredients | Weight (grams) | Solids (grams) |
|---|---|---|
| of Example M | | |

Application Conditions

Each of the coating compositions of examples 1 to 6 was reduced in viscosity to 24 seconds (#4 Ford cup at 75° F. (23.9° C.)) with xylene before spray application. These coatings were applied as clear coats over a solventborne black pigmented base coat available from PPG Industries, Inc., as WDBC8555, which was reduced in viscosity to 19 seconds (#2 Fisher cup at 75° F. (23.9° C.)) with xylene before spray application. Panels were cold rolled steel electrocoated with a composition available from PPG Industries, Inc., as ED5000.

The base coat was applied in two coats to the panels with a 90 second flash between coats. After applying the second coat a 5 minute flash was allowed before the clear coat application. The clear coat was applied in two coats with a 90 second flash between coats. A 15 minute flash was then allowed before curing one panel for each composite coating in a horizontal position and one panel for each composite coating in a vertical position at 285° F. (140.5° C.) for 30 minutes. The properties are reported in Table I below.

TABLE I

| Example | Film Thickness$^1$, mils (microns) | Vertical Sag$^2$ (cm) | Vertical DOI$^3$ | Horizontal DOI$^4$ |
|---|---|---|---|---|
| 1 (Control) | 1.8 (45.72) | 3.4 | 89 | 97 |
| 2 (Comparative) | 2.0 (50.8) | 0.4 | 82 | 91 |
| 3 | 1.9 (48.26) | 0 | 92 | 93 |
| 4 | 2.0 (50.8) | 0.1 | 90 | 91 |
| 5 | 2.0 (50.8) | 0.2 | 88 | 91 |
| 6 | 2.2 (55.88) | 0 | 83 | 93 |

$^1$Film thickness was determined using a Fischer Permascope model M10B-GAB1.3, available from Fischer Technical Inc.
$^2$Sag was measured in length from the bottom of a prepunched hole 8 mm in diameter, located ½ inch (1.27 cm) from the top of the vertical panel.
$^3$Vertical DOI (distinctness of image) was determined using Hunter Lab Dorigon II, available from Hunter Associates Laboratory, Inc., on panels which were cured in a vertical position.
$^4$Horizontal DOI was determined on panels which were cured in a vertical position.

The data reported in Table I indicate that sag is much lower for panels coated with compositions containing rheology control additives than for the control which contained no rheology control additive. In addition, the vertical and horizontal DOI were in general much more closely correlated as is desirable, for the examples containing rheology control additives prepared in accordance with the invention than for the control or the comparative example.

We claim:

1. A non-gelled copolymer comprising a reaction product of:
   about 80 to about 95 percent by weight of at least one ethylenically unsaturated aliphatic or aromatic monomer selected from those that are unsubstituted with reactive functionality and those that have hydroxyl functionality;
   about 3 to about 6 percent by weight of an ethylenically unsaturated monomer having one acid functional group; and
   about 2 to about 14 percent by weight of an ethylenically unsaturated oligomeric monomer having a number average molecular weight of about 1500 to about 4000 and which is derived from a hydroxyl functional acid having a predominantly hydrocarbon chain of from about 10 to 19 carbon atoms; wherein the percentages by weight are based upon the total solid weight of reactants used to prepare the copolymer.

2. The non-gelled copolymer of claim 1, wherein the ethylenically unsaturated unsubstituted or hydroxyl functional aliphatic or aromatic monomer is an alkyl ester of acrylic acid or methacrylic acid with an alkyl group having from about 1 to 17 carbon atoms.

3. The non-gelled copolymer of claim 1, wherein the ethylenically unsaturated aliphatic or aromatic monomer that is unsubstituted with reactive functionality is selected from the group consisting of methyl methacrylate, butyl acrylate, butyl methacrylate, styrene, and mixtures thereof.

4. The non-gelled copolymer of claim 3, wherein the ethylenically unsaturated monomer is a mixture comprising about 45 to about 55 percent by weight methyl methacrylate; about 30 to about 36 percent by weight butyl acrylate; and about 5 to about 6 percent by weight styrene; wherein the percentages by weight are based upon the total solid weight of reactants used to prepare the copolymer.

5. The non-gelled copolymer of claim 1, wherein the ethylenically unsaturated monomer having one acid functional group is selected from the group consisting of acrylic acid and methacrylic acid.

6. The non-gelled copolymer of claim 1, wherein the ethylenically unsaturated oligomeric monomer derived from a hydroxyl functional fatty acid has 0.7 to 1 unsaturated groups per molecule.

7. The non-gelled copolymer of claim 1, wherein the hydroxyl functional acid is a hydroxyl functional fatty acid that is 12hydroxystearic acid.

8. The non-gelled copolymer of claim 1, which includes hydroxyl functional ethylenically unsaturated monomer selected from the group consisting of: hydroxypropyl (meth) acrylate, hydroxyethyl (meth) acrylate, hydroxybutyl (meth) acrylate, and hydroxypropylacrylates, or hydroxybutylacrylates that is present in an amount up to 10% by weight, based upon the total solid weight of reactants used to prepare the copolymer.

9. The non-gelled copolymer of claim 1 present in a coating composition with a carrier selected from the group consisting of water and organic solvents.

10. The non-gelled copolymer of claim 1 present in a coating composition with a carrier selected from the group consisting of water and organic solvents, a polymeric film-forming resin, and at least one pigment.

11. The non-gelled copolymer of claim 1 present in an amount from 50 to 90 percent by weight with an amount from 10 to 50 percent by weight of a hydrophobic amorphous fumed silica, wherein the ratio of the copolymer to the silica is in the range of 9:1 to 1:1, and wherein the silica is dispersed in the copolymer and the percentages by weight are based upon the total weight of solids for the additive mixture.

12. A coating composition comprising a carrier selected from the group consisting of water and organic solvents, a polymeric film-forming resin, up to about 2.5 percent by weight of a hydrophobic amorphous fumed silica, and about 1 to about 22.5 percent by weight of the copolymer of claim 1, wherein the percentages by weight are based on the total weight of resin solids and wherein the coating optionally has at least one pigment.

13. The coating composition of claim 12, wherein the polymeric film-forming resin comprises a polyepoxide and a polyacid curing agent.

14. The coating composition of claim 13, wherein the coating composition is one-component.

15. The coating composition of claim 12, wherein the hydrophobic amorphous fumed silica is present at from about 1 to about 2.5 percent by weight and the copolymer of claim 1 is present in an amount from about 3 to about 18 percent by weight, wherein the percentages by weight are based on the total weight of resin solids.

16. A non-gelled copolymer having a weight average molecular weight of about 7,000 to 18,000, comprising a reaction product of:
   about 80 to about 95 percent by weight of at least one ethylenically unsaturated monomer selected from the group consisting of methyl methacrylate, butyl acrylate, butyl methacrylate, styrene, and mixtures thereof;
   about 3 to about 6 percent by weight of an ethylenically unsaturated monomer having one acid functional group selected from the group consisting of acrylic acid and methacrylic acid; and
   about 2 to about 14 percent by weight of an ethylenically unsaturated oligomeric monomer having a number average molecular weight of about 1500 to about 4000 and which is derived from 12-hydroxystearic acid; wherein the percentages by weight are based upon the total solid weight of reactants used to prepare the copolymer.

17. A non-gelled copolymer of claim 16 present in an amount from 50 to 90 percent by weight along with an amount of from 10 to 50 percent by weight of a hydrophobic amorphous fumed silica, wherein the silica is dispersed in the copolymer and the percentages by weight are based upon total weight of solids for a rheology control additive mixture.

18. A non-gelled copolymer of claim 16 present in an amount from 65 to 70 percent along with an amount of 30 to 35 percent by weight of a hydrophobic amorphous fumed silica, wherein the silica is dispersed by grinding the silica into the copolymer and the percentages by weight are based upon total weight of solids for a rheology control additive mixture.

19. The non-gelled copolymer of claim 1, wherein the percent by weight of the ethylenically unsaturated oligomeric monomer is 2 to 7.

20. The non-gelled copolymer of claim 1, wherein ethylenically unsaturated oligomeric monomer is prepared by condensation reaction yielding a polyester or polyether.

21. The non-gelled copolymer of claim 20, wherein condensation reaction is selected from the group consisting of: a) homopolymerization resulting in acid functional polyester that is subsequently reacted with a monoepoxy group-containing polymerizable unsaturated compound, and b) copolymerization with a saturated monoacid or diacid having a hydrocarbon chain of from about 10 to 19 carbon atoms resulting in a polyester that is reacted with a monoepoxy group-containing polymerizable unsaturated compound.

22. The non-gelled copolymer of claim 1, wherein ethylenically unsaturated oligomeric monomer is selected from the group consisting of the reaction product of stearic acid with 12-hydroxystearic acid in a 1 to 5 mole ratio, and homopolymerized 12-hydroxystearic acid that results in an acid functional polyester either of which is further reacted with glycidyl methacrylate in a 1 to 1 mole ratio.

* * * * *